US011745762B2

(12) United States Patent
Ma et al.

(10) Patent No.: US 11,745,762 B2
(45) Date of Patent: Sep. 5, 2023

(54) SYSTEM AND METHODS OF ADAPTIVE TRAJECTORY PREDICTION FOR AUTONOMOUS DRIVING

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

(*) Notice: Subject to any disclaimer, the term of this patent is extended or adjusted under 35 U.S.C. 154(b) by 0 days.

(21) Appl. No.: 17/816,909

(22) Filed: Aug. 2, 2022

(65) Prior Publication Data

US 2023/0030786 A1 Feb. 2, 2023

Related U.S. Application Data

(60) Provisional application No. 63/366,738, filed on Jun. 21, 2022, provisional application No. 63/228,590, filed on Aug. 2, 2021, provisional application No. 63/228,589, filed on Aug. 2, 2021.

(51) Int. Cl.
*B60W 60/00* (2020.01)
*B60W 40/04* (2006.01)
(Continued)

(52) U.S. Cl.
CPC ........ *B60W 60/0011* (2020.02); *B60W 40/04* (2013.01); *B60W 50/0097* (2013.01);
(Continued)

(58) Field of Classification Search
None
See application file for complete search history.

(56) References Cited

U.S. PATENT DOCUMENTS

2015/0154871 A1 6/2015 Rothoff et al.
2017/0220037 A1 8/2017 Berestov et al.
(Continued)

FOREIGN PATENT DOCUMENTS

WO 2017/147007 A1 8/2017

OTHER PUBLICATIONS

PCT International Search Report and Written Opinion issued in corresponding application No. PCT/US2022/039198, dated Dec. 6, 2022.

(Continued)

*Primary Examiner* — Tamara L Weber
(74) *Attorney, Agent, or Firm* — Maschoff Brennan

(57) ABSTRACT

A method may include obtaining one or more inputs in which each of the inputs describes at least one of: a state of an autonomous vehicle (AV) or a state of an object; and identifying a prediction context of the AV based on the inputs. The method may also include determining a relevancy of each object of a plurality of objects to the AV in relation to the prediction context; and outputting a set of relevant objects based on the relevancy determination for each of the plurality of objects. Another method may include obtaining a set of objects designated as relevant to operation of an AV; selecting a trajectory prediction approach for a given object based on context of the AV and characteristics of the given object; predicting a trajectory of the given object using the selected trajectory prediction approach; and outputting the given object and the predicted trajectory.

14 Claims, 10 Drawing Sheets

(51) Int. Cl.
  *B60W 50/00*   (2006.01)
  *B60W 50/06*   (2006.01)
  *G05B 13/04*   (2006.01)

(52) U.S. Cl.
  CPC ........ *B60W 50/06* (2013.01); *B60W 60/0015* (2020.02); *B60W 60/0027* (2020.02); *B60W 60/00274* (2020.02); *G05B 13/048* (2013.01); *B60W 2050/0005* (2013.01); *B60W 2050/065* (2013.01); *B60W 2554/4045* (2020.02); *B60W 2554/802* (2020.02); *B60W 2556/30* (2020.02); *B60W 2556/40* (2020.02)

(56) References Cited

U.S. PATENT DOCUMENTS

| 2017/0329332 | A1 | 11/2017 | Pilarski et al. |
| 2019/0258251 | A1 | 8/2019 | Ditty et al. |
| 2020/0023838 | A1* | 1/2020 | Zhang ............... B60W 30/0953 |
| 2020/0047750 | A1 | 2/2020 | Likhachev et al. |
| 2020/0207375 | A1 | 7/2020 | Mehta |
| 2020/0232801 | A1 | 7/2020 | Kim et al. |
| 2020/0401892 | A1 | 12/2020 | Redding et al. |
| 2021/0110484 | A1 | 4/2021 | Shalev-Shwartz et al. |
| 2021/0272018 | A1* | 9/2021 | Casas ..................... G05B 17/02 |
| 2022/0001892 | A1* | 1/2022 | Fairley ................. G06V 20/582 |
| 2022/0055643 | A1 | 2/2022 | Young et al. |
| 2022/0119012 | A1 | 4/2022 | Agon et al. |
| 2022/0214690 | A1 | 7/2022 | Nichols |
| 2022/0234618 | A1* | 7/2022 | Kabzan ................. B60W 30/09 |

OTHER PUBLICATIONS

U.S. Office Action issued in corresponding U.S. Appl. No. 17/816,906, dated Dec. 8, 2022.

International Search Report and Written Opinion of the ISA dated Dec. 19, 2022 as received in Application No. PCT/US2022/039200.

* cited by examiner

SYSTEM AND METHODS OF ADAPTIVE TRAJECTORY PREDICTION FOR AUTONOMOUS DRIVING

CROSS-REFERENCE TO RELATED APPLICATIONS

This application claims the benefit of U.S. Patent Application Ser. No. 63/228,589, filed on Aug. 2, 2021, U.S. Patent Application Ser. No. 63/228,590, filed on Aug. 2, 2021, and U.S. Patent Application Ser. No. 63/366,738, filed on Jun. 21, 2022; the disclosures of which are incorporated herein by reference in their entireties.

The present disclosure generally relates to a system and methods of adaptive relevancy prediction for autonomous driving and/or adaptive trajectory prediction for autonomous driving.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that includes obtaining one or more inputs in which each of the inputs describes at least one of: a state of an autonomous vehicle (AV) or a state of an object; and identifying a prediction context of the AV based on the inputs. The method may also include determining a relevancy of each object of a plurality of objects to the AV in relation to the prediction context; and outputting a set of relevant objects based on the relevancy determination for each of the plurality of objects.

One or more embodiments of the present disclosure may include a method consistent and/or compatible with one or more of the methods of the present disclosure, where identifying the prediction context may include obtaining a first input of a localization of the AV in a map; obtaining a second input of a mode of operation of the AV; and obtaining a third input of a driving strategy of the AV, and where the prediction context is based on a combination of the localization, the mode of operation, and the driving strategy.

One or more embodiments of the present disclosure may include a method consistent and/or compatible with one or more of the methods of the present disclosure, where determining the relevancy of a given object may include obtaining intent information and state information of the given object; following a tree construct based on the intent information, the state information, and the prediction context to generate a relevancy value; and comparing the relevancy value to a relevancy threshold.

One or more embodiments of the present disclosure may include a method consistent and/or compatible with one or more of the methods of the present disclosure, where following the tree construct may include determining whether a distance to the given object is beyond a threshold distance; and based on the given object being beyond the threshold distance, designating the given object as irrelevant.

One or more embodiments of the present disclosure may include a method consistent and/or compatible with one or more of the methods of the present disclosure, where the threshold distance varies based on the prediction context.

One or more embodiments of the present disclosure may include a method consistent and/or compatible with one or more of the methods of the present disclosure, where the method may also include classifying the given object as relevant based on the comparison to the relevancy threshold; and storing a decision at each node of the tree construct with the given object in a cache.

One or more embodiments of the present disclosure may include a method consistent and/or compatible with one or more of the methods of the present disclosure, where the method may also include monitoring characteristics involved in the decisions at the nodes of the tree construct; based on a change in the characteristics, designating the given object as irrelevant; and removing the given object from the cache.

One or more embodiments of the present disclosure may include a method consistent and/or compatible with one or more of the methods of the present disclosure, where determining the relevancy of a given object may include selecting one or more tree constructs to follow, where the tree constructs may be selected to correspond with the prediction context.

One or more embodiments of the present disclosure may include a method consistent and/or compatible with one or more of the methods of the present disclosure, where the method may also include obtaining intent information and state information of the given object; and where determining the relevancy of a given object may include performing a multi-factorial analysis that considers multiple factors, at least one of the factors related to the prediction context, the intent information, or the state information.

One or more embodiments of the present disclosure may include a method that may include obtaining a set of objects designated as relevant to operation of an AV; and selecting a trajectory prediction approach for a given object based on context of the AV and characteristics of the given object. The method may also include predicting a trajectory of the given object using the selected trajectory prediction approach; and outputting the given object and the predicted trajectory.

One or more embodiments of the present disclosure may include a method consistent and/or compatible with one or more of the methods of the present disclosure, where the method may also include selecting a secondary trajectory prediction approach for the given object; and predicting a secondary trajectory of the given object using the secondary trajectory prediction approach, where outputting the given object and the predicted trajectory may also include outputting a stream of the predicted trajectory and the secondary trajectory with the given object.

One or more embodiments of the present disclosure may include a method consistent and/or compatible with one or more of the methods of the present disclosure, where the secondary trajectory approach may be different from the selected trajectory prediction approach and may utilize more computing resources than the first trajectory prediction approach.

One or more embodiments of the present disclosure may include a method consistent and/or compatible with one or more of the methods of the present disclosure, where the secondary trajectory approach may include one of a learning-based trajectory prediction approach, a statistics-based trajectory prediction approach, or a multi-agent based trajectory prediction approach.

One or more embodiments of the present disclosure may include a method consistent and/or compatible with one or more of the methods of the present disclosure, where the method may also include monitoring a computational intensity of a computing device performing the prediction of the trajectory of the given object.

One or more embodiments of the present disclosure may include a method consistent and/or compatible with one or more of the methods of the present disclosure, where the method may also include, based on the computational intensity exceeding a first threshold, decreasing at least one of: (1) a length of time of the prediction of the trajectory, (2) a number of points in the projected trajectory, or (3) a frequency at which the projected trajectory is updated.

One or more embodiments of the present disclosure may include a method consistent and/or compatible with one or more of the methods of the present disclosure, where the method may also include, based on the computational intensity being below a second threshold, increasing at least one of: (1) a length of time of the prediction of the trajectory, (2) a number of points in the projected trajectory, or (3) a frequency at which the projected trajectory is updated.

One or more embodiments of the present disclosure may include non-transitory computer-readable medium storing instructions that, when executed by one or more processors, are configured to cause a system to perform operations, such as operations consistent with one or more of the methods described herein and/or associated systems.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Predicting the position and/or motion of objects in the vicinity of an autonomous vehicle (AV) during movement of the AV may require both fast and accurate predictions to prevent collisions and other accidents. Additionally, such trajectory predictions may require a certain degree of granularity such that the predicted trajectories are useful for decision-making by the AV. The present disclosure relates to, among other things, predicting a relevancy and/or trajectory of objects in the vicinity of the AV such that the predicted trajectories may be output quickly, accurately, and at a useful level of granularity. Trajectory prediction according to the present disclosure may improve the decision-making capabilities and overall safety of autonomous vehicles.

Embodiments of the present disclosure will be explained with reference to the accompanying drawings.

Embodiments of the present disclosure will be explained with reference to the accompanying drawings.

Figure 1:
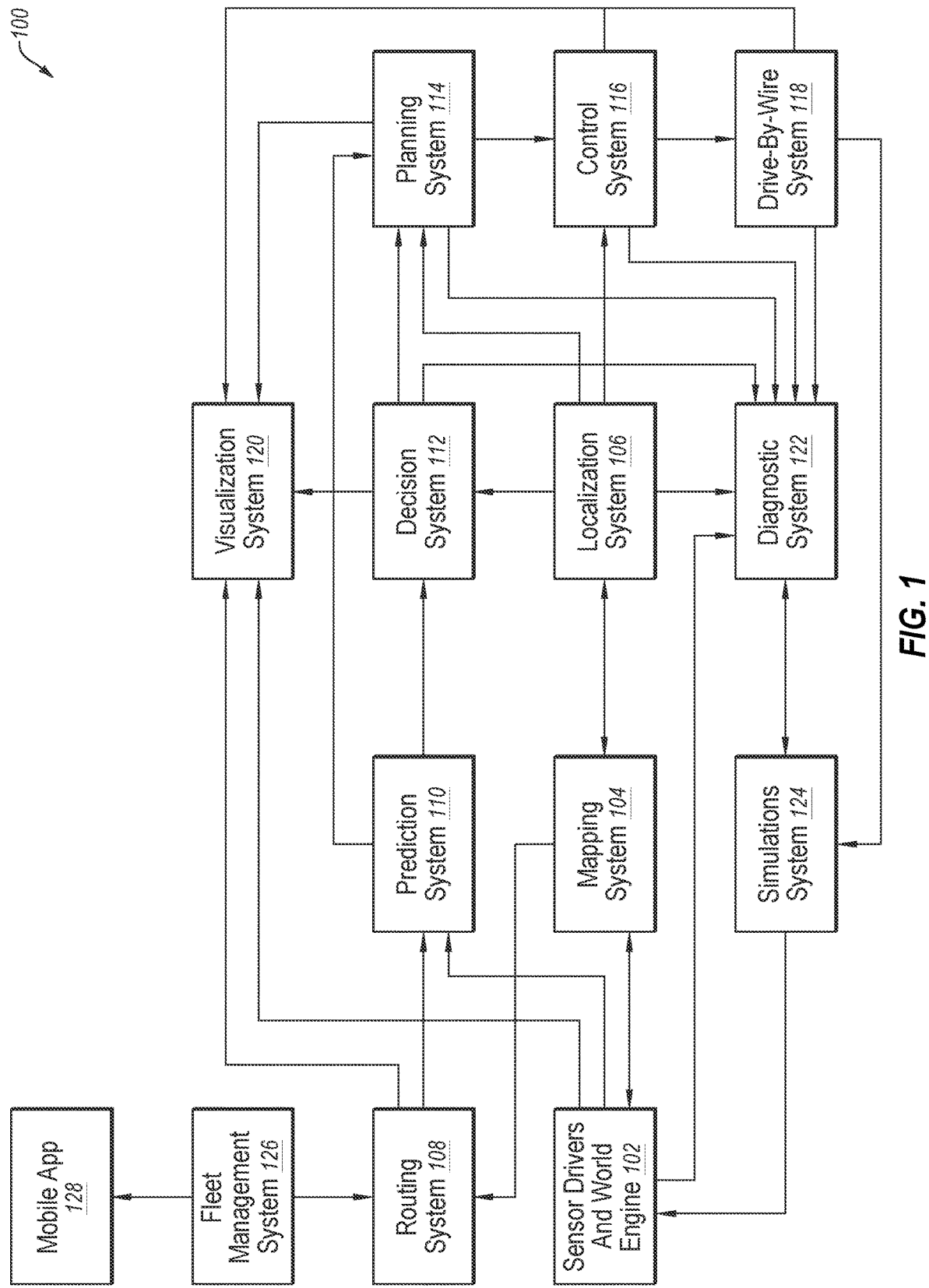
FIG. 1 illustrates an example embodiment of an autonomous driving system according to at least one embodiment of the present disclosure.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the graphing module 120 and the quadratic computation module 130 are delineated in the specific manner described to help with explaining concepts described herein but such delineation is not meant to be limiting. Further, the autonomous driving system 100 may include any number of other elements or may be implemented within other systems or contexts than those described.

Figure 2:
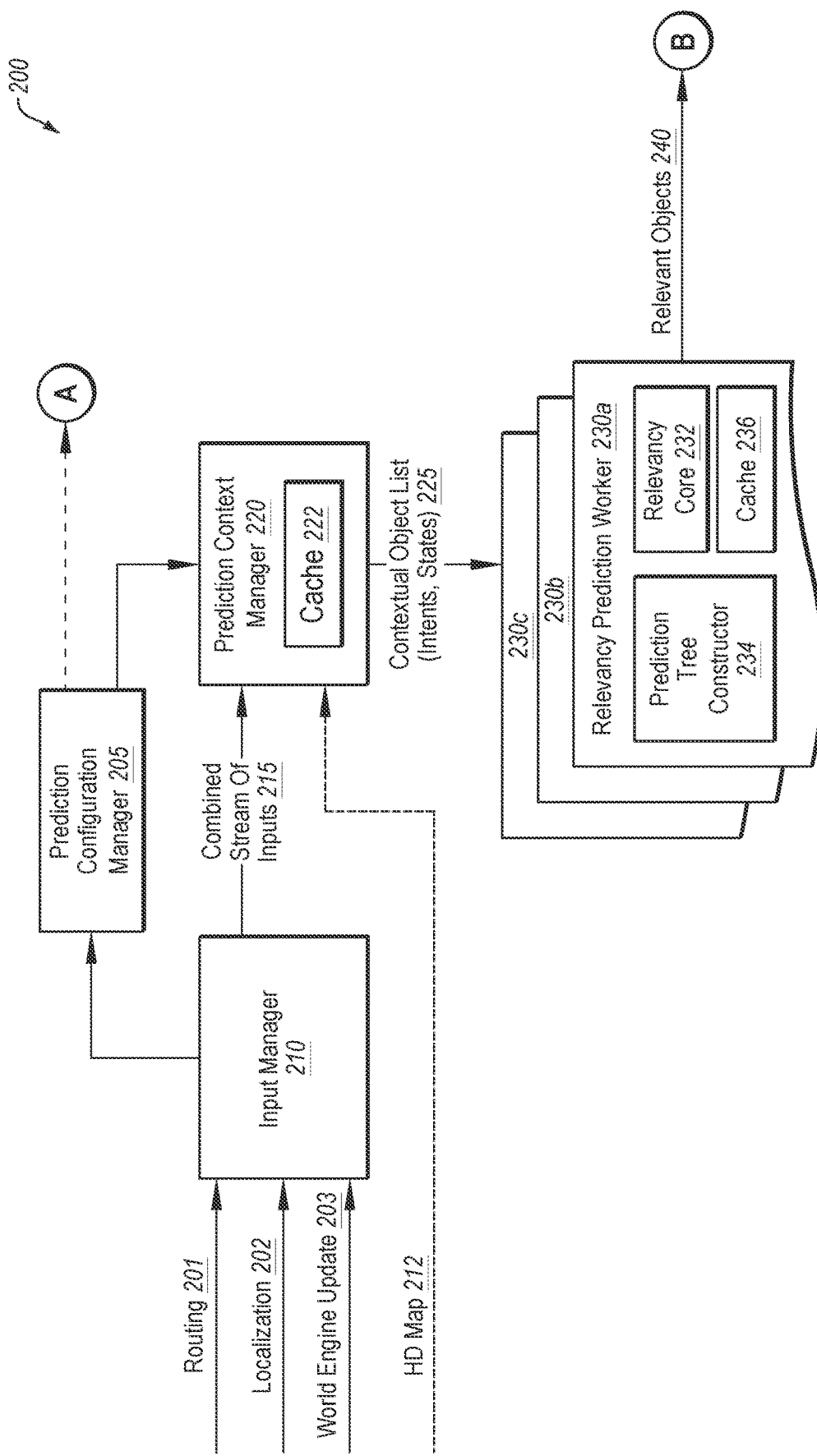
FIG. 2 illustrates an example system of adaptive prediction for autonomous driving according to one or more embodiments of the present disclosure.
Figure 3:
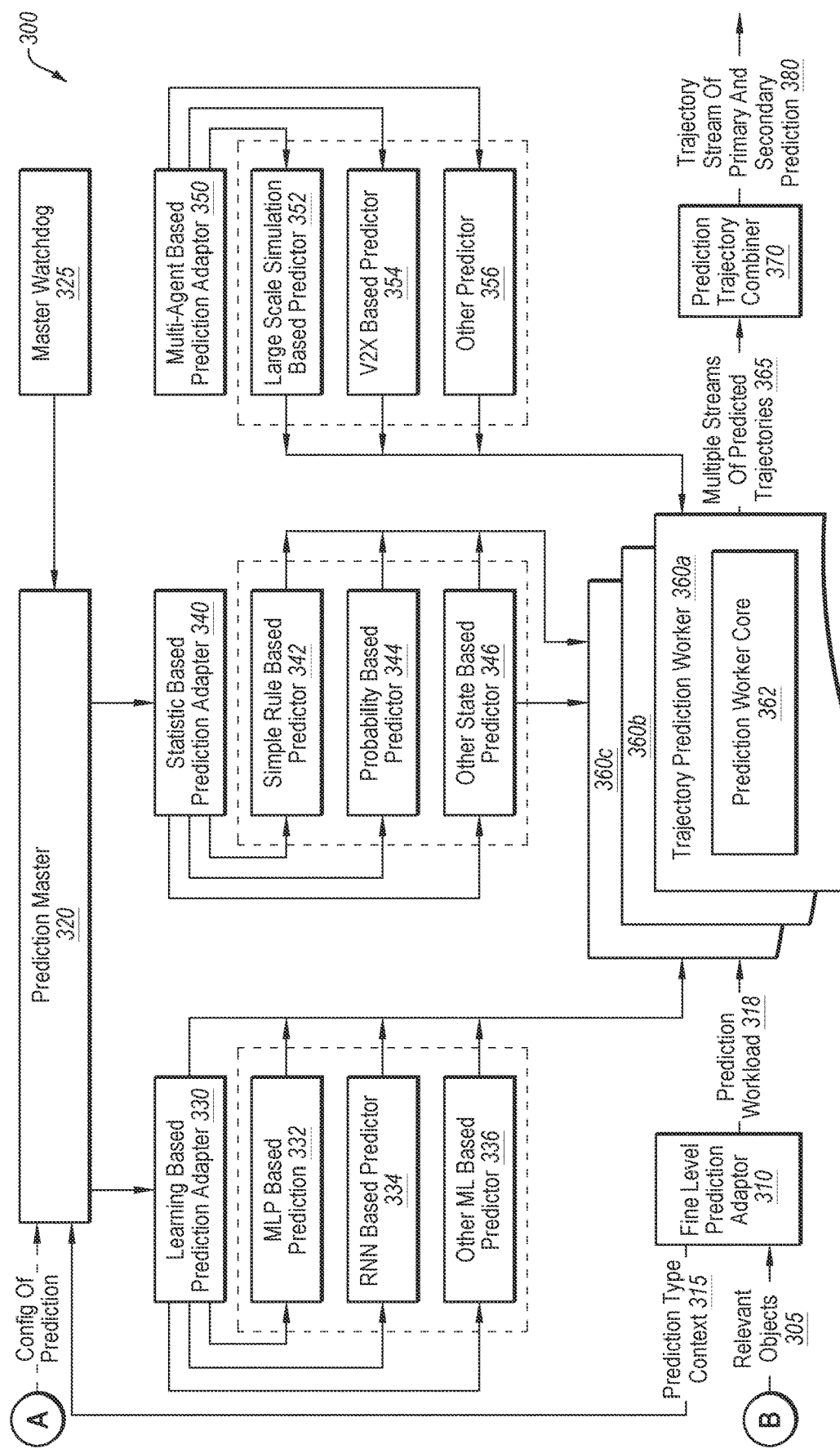
FIG. 3 illustrates an example system of adaptive trajectory prediction for autonomous driving according to one or more embodiments of the present disclosure.

FIG. 2 illustrates an example system 200 of adaptive prediction for autonomous driving according to the present disclosure. In some embodiments, the adaptive prediction system may include an input manager 210 that obtains one or more inputs that describe a state of the AV and/or a state of one or more objects, such as routing information 201, localization information 202, world engine updates 203, and/or high-definition mapping information 212, and generates a combined stream of inputs 215 based on the obtained inputs. In these and other embodiments, a prediction configuration manager 205 may configure the input manager 210, a prediction context manager 220, a prediction master (as illustrated in FIG. 3), and/or any other component of the adaptive prediction system.

In some embodiments, the prediction configuration manager 205 may provide operational parameters of the various components of the system 200. For example, properties related to available computing resources, receive user input directing aspects of the operation of the prediction system 200. For example, the prediction configuration manager 205 may identify an amount of computing resources to be used for various operations, a goal or mission of an AV, a size of a cache, various timing factors (e.g., time window of combining inputs, frequency of generating predictions, among others), size of data to provide between and/or among components of the system 200, among other configuration parameters. In some embodiments, the prediction configuration manager 205 may configure the handling of the one or more of the inputs included in the combined stream of inputs 215 to align one or more properties of the inputs included in the combined stream of inputs 215. For example, the prediction configuration manager 205 may configure frequencies and/or expected formatting of each of the inputs received by the input manager 210 such that the combined stream of inputs includes a single frequency of data capture and/or data format. As another example, the prediction configuration manager 205 may direct an input and/or output topology for the combined input stream 215, apply one or more heuristic rules to the combined input stream to configure the data included in the combined input stream 215 for downstream analysis (e.g., by a relevancy prediction worker 230 and/or a trajectory prediction worker (as illustrated in FIG. 3)).

In some embodiments, the input manager 210 may configure, manage, or otherwise process the input data based on configuration information of the prediction configuration manager 205. For example, the configuration information may be based on the environment in which the AV is operating, a speed of the AV, a variability of the operation of the AV and/or the environment, etc. In these and other embodiments, the configuration information may be designated by an operator of the AV, a developer/programmer of the AV, any other user associated with the AV, automatically generated by the AV itself, etc., and/or combinations thereof.

In some embodiments, the input manager 210 may combine the various inputs, such as the routing information 201, the localization information 202, and/or the world engine update information 203. In some embodiments, the input manager 210 may monitor a frequency of which the various inputs are received such that the combined stream of inputs 215 may be aligned in frequency and/or packaged in a form such that the prediction context manager 220 is able to utilize the combined stream of inputs 215. In some embodiments, the input manager 210 may discard some of the inputs that occur at a higher frequency and/or when the input manager 210 is configured to output information at a lower frequency such that the prediction context manager 220 receives a manageable amount of data. In these and other embodiments, the input manager 210 may manage the size of the combined streams of data 215 to align with configuration information from the configuration manager 205 directing a size of the combined streams of data 215. Additionally or alternatively, the input manager 210 may remove duplicate information from the inputs to reduce the size of the combined streams of data 215.

In some embodiments, the input manager 210 may or may not perform some preliminary processing of the inputs to offload some of the processing by the prediction context manager 220 and/or the relevancy prediction workers 230. Such preliminary processing may include lightweight computing tasks such as averaging, regressions, formatting of data structures, among others.

In some situations, computing systems included in the AV may detect multiple objects as reflected in the inputs 201, 202, 203, and/or the HD map 212, but only a subset of the objects may be relevant to decision-making by the AV. For example, people sitting at a table in a restaurant adjacent to a roadway may be irrelevant to the decision-making of the AV. Without identifying the relevant subset of objects, a trajectory prediction system may functionally operate to predict the trajectory for each and every detected object, which may be prohibitively costly in terms of processing and computing resources. In some embodiments, the prediction context manager 220 may determine one or more pieces of contextual information relating to the AV that may qualify a relevancy of objects included in the vicinity of the AV based on the combined stream of inputs 215. For example, the prediction context manager 220 may identify an environment of the AV as being within a warehouse. In a warehouse setting, most or all of the objects included in the combined stream of inputs may be relevant because the AV may be capable of moving to any location within the warehouse environment. As another example, the prediction context manager 220 may identify the environment of the AV as being a public highway road. In a highway setting, not all of the objects included in the combined stream of inputs may be relevant because the AV may only be capable of moving on one half of the road and only in one lane at a given time.

In these and other embodiments, the prediction context manager 220 may include a context cache 222 that stores contextual information about the AV (e.g., vehicle make/model, vehicle size, vehicle specifications, etc.) and/or the environment of the AV. The contextual information stored in the context cache 222 may be retrieved more efficiently for frequently used prediction operations. Additionally or alternatively, the cache 222 of the prediction context manager 220 may store a set of detected and/or processed objects. In this manner, the prediction context manager 220 may monitor for newly detected objects to determine their relevancy without the redundancy of having to cycle through and/or process each object detected.

In some embodiments, to determine the context, the prediction context manager 220 may utilize the combined stream of inputs 215. For example, the localization input 202 may indicate a particular location of the AV within the HD map 212. In some embodiments, the prediction context manager 220 may include multiple factors such as a physical location or other physical parameters, a mode of operation, and a mission/strategy which may represent a purpose for operating the AV. For example, a physical location of a warehouse, a highway, a rural road, or a residential road changes the context. As another example, a speed at which the AV is traveling may impact which objects are relevant. As a further example, when operating in a debugging mode, nearly every object may be considered as relevant while in a normal mode or an efficient mode of operation, fewer and fewer objects may be relevant. As an additional example, a strategy of a leisurely drive may allow for a more inclusive and robust number of objects as relevant while an aggressive and urgent trip may utilize a lower number of relevant objects. In these and other embodiments, the prediction context manager 220 may perform any combination approach or multifactorial analysis to determine the context. For example, the prediction context manager 220 may utilize one or more heuristics or rules that identify a given context based on the multiple factors. As another example, the prediction context manager 220 may utilize a machine learning model to identify the context.

The contextual information determined by the prediction context manager 220 may be used to generate a contextual object list 225 in which each of the objects included in the combined stream of inputs 215 is paired with corresponding contextual information. In some embodiments, the objects included in the contextual object list 225 may each include an intent and/or a state of the object. The state of the object may represent physical parameters of the object, such as a distance between the object and the AV, velocity, position, acceleration, size, orientation, among others. The intent of the object may include information that may be gleaned based on other information regarding related to the object to facilitate a more accurate prediction of trajectory. For example, the intent may include a classification of the object (e.g., a pedestrian, another vehicle, a road hazard, a barrier, a tree, among others), rules related to the object (e.g., a train will travel on tracks, a mail truck or bus makes frequent stops, a bicycle cannot make instantaneous turns, among others), or other factors that relate to aspects of the objects other than physical parameters.

In some embodiments, the contextual object list 225 may be obtained by the relevancy prediction workers 230a, b, and c (which may be referred to collectively as relevancy prediction workers 230) and one or more relevant objects 240 may be identified. In some embodiments, the relevancy prediction workers 230 may include a prediction tree constructor 234 and/or a relevancy core 232 configured to classify objects included in the contextual object list as relevant or irrelevant objects based on one or more decision trees determined by the prediction tree constructor 234 and/or other decision-making techniques.

The relevancy core 232 may be configured to determine the relevancy of a given object. For example, the relevancy core 232 may apply a machine learning process, a heuristic approach, a statistical analysis, or any other methodology to designate the given object as relevant or irrelevant. For example, such an approach may utilize the state and/or intent relative to the context as inputs to the relevancy core 232 to generate a relevancy score which may be compared to a threshold. In these and other embodiments, the intent and/or state of the given object may be analyzed based on the context to determine whether or not, within the identified context, the object according to the intent and/or state are relevant to the operation of the AV. In some embodiments, the relevancy core 232 may utilize a random approach, including a "flip of a coin" to determine whether or not a given object is relevant.

The prediction tree constructor 234 may generate and/or include one or more decision trees that facilitate classification of the objects as relevant or irrelevant by applying logic of the decision trees according to the contextual information associated with each of the objects based on the state and/or intent of the object. For example, a given decision tree may begin by determining whether a given object is within a threshold distance to the AV in which the threshold distance may depend on contextual information associated with the given object and/or the AV. Responsive to determining the given object is further than the threshold distance, the given decision tree may classify the given object as irrelevant. Responsive to determining the given object is within the threshold distance, the given decision tree may continue with one or more additional inquiries, such as determining whether the given object is within a region of interest of the AV, whether the given object is a pedestrian, and/or any other inquiries about the given object.

In some embodiments, based on a given object being classified as relevant, the object and/or information associated with the given object may be added to a set of relevant objects 240. Such additional information may include the intent information, the state information, and/or other information related to the given object. The set of relevant objects 240 may be output for downstream processing, such as trajectory prediction for the relevant objects, route prediction, among others.

In these and other embodiments, the relevancy prediction workers 230 may include a relevancy cache 236 that stores object information relating to objects included within a region of interest of the AV. In some embodiments, each object may conceptually include a corresponding cache. Caching the object information for objects included within the region of interest of the AV (e.g., a region within a threshold distance of the AV, such as the distance the AV is predicted to travel in the next 3 seconds or 5 seconds, etc.) may facilitate more efficient computations for the objects including cached information because computations related to such objects may be performed more frequently by the relevancy prediction workers 230. As such, computations related to such cached object information may be performed more quickly, and computational resources may be focused on newly detected objects and/or objects entering and/or exiting the region of interest of the AV. For example, if a given object is identified as relevant based on a particular decision/prediction tree and/or operation of the relevancy core 232, the corresponding features and/or decisions identifying it as relevant may be stored in the cache for that object. Based on one of those pieces of information changing, the information in the cache 236 may be recalled and revisited in light of the updated information to determine if the object has shifted to an irrelevant object (e.g., if an on-coming vehicle has passed the AV and is now driving further and further away from the AV). The cached information may also be used vice versa to determine if something has shifted from irrelevant to relevant. Additionally or alternatively, the cached information regarding the relevancy of the objects may be maintained to facilitate checking and verifying that the relevant objects are accounted for.

In some embodiments, the information used by the relevancy core 232 and/or the prediction tree constructor 234 may be stored in the cache 236 to facilitate rapid re-analysis of the relevancy of a given object. For example, for a given object being classified as relevant or irrelevant using a tree construct, the cache 236 may store the results at each branch of the tree construct and the piece of information used to make that decision. As another example, the relevancy core 232 may utilize a given machine learning approach and may store the inputs to the machine learning algorithm and the result.

In some embodiments, the relevancy prediction performed by the relevancy prediction workers 230 may occur at a relatively high conceptual level such that, with little computing resources, at least some of the objects may be discarded as irrelevant such that the objects classified as relevant are reserved for the full, more-robust trajectory prediction analysis (such as that described with reference to FIG. 3). The trajectory prediction analysis may be performed at a more detailed level such that the path of travel of various objects may be facilitated.

Modifications, additions, or omissions may be made to the system 200 without departing from the scope of the present disclosure. For example, the designations of different elements in the manner described is meant to help explain concepts described herein and is not limiting. For instance, in some embodiments, the prediction context manager 220, the relevancy prediction workers 230, and/or other components of the system 200 are delineated in the specific manner described to help with explaining concepts described herein but such delineation is not meant to be limiting. Further, the system 200 may include any number of other elements or may be implemented within other systems or contexts than those described.

FIG. 3 illustrates an example system 300 of adaptive trajectory prediction for autonomous driving, according to one or more embodiments of the present disclosure. The system 300 may include a fine level prediction adaptor 310, a prediction master 320, a master watchdog 325, one or more learning-based prediction adaptors 330, one or more statistic-based prediction adaptors 340, one or more multi-agent based prediction adaptors 350, one or more trajectory prediction workers 360. The fine level prediction adaptor 310 may receive a set of relevant objects 305 and the prediction master 320 may select one or more trajectory prediction workers 360 to be instantiated from the learning-based prediction adaptors 330, statistic-based prediction adaptors 340, and/or multi-agent based prediction adaptors 350 to generate one or more predicted trajectories of each of the relevant objects 305 in the vicinity of an autonomous vehicle AV within a given time period (e.g., within the next two seconds, three seconds, five seconds, etc.). In some embodiments, the set of relevant objects 305 may include relevant objects identified by the relevancy prediction workers 230 of FIG. 2.

In some embodiments, the relevant objects 305 may first be obtained by the fine level prediction adaptor 310 before being sent to the prediction master 320. The fine level prediction adaptor 310 may configure one or more aspects of the relevant objects 305 such that the prediction master 320 may effectively analyze the relevant objects. For example, the fine level prediction adaptor 310 may reformat the relevant objects and/or pair the relevant objects with suitable contextual information relating to a prediction type context 315 to provide the prediction master 320 with more information. Such context information may include the prediction context as determined by the prediction context manager 220 of FIG. 2. In these and other embodiments, the fine level prediction adaptor 310 may utilize context information (such as that from the prediction context manager 220 of FIG. 2) to identify, direct, or control a size or duration of the prediction that the prediction master 320 may be causing to be generated. For example, based on the context, the fine level prediction adaptor 310 may send a prediction type context 315 that directs the prediction manager to generate one or more predicted trajectories for the next three seconds, five seconds, or any other temporal duration. The prediction type context 315 may additionally or alternatively identify a distance over which to predict the trajectory, a level of detail to which the trajectory is to be predicted, or any other aspects of the trajectory that may be advantageously adjusted based on the context in which the trajectory is being predicted.

In some embodiments, the prediction master 320 may obtain the relevant objects 305. In these and other embodiments, the prediction master 320 may analyze the relevant objects 305 based on the prediction type context 315 associated with each of the relevant objects 305 to determine one or more trajectory-prediction methods or approaches that may be beneficially used to predict the trajectory of each of the relevant objects 305. In these and other embodiments, the prediction master 320 may consider a given prediction type context including information such as a location of the AV, a location of the relevant objects, a vehicle type of the AV, and/or a type of the relevant objects (e.g., information indicating whether the relevant object is a pedestrian, a wall, another vehicle, and/or any other objects that may be identified in the surroundings of the AV) and select one or more suitable trajectory-prediction methods or approaches according to the prediction type context 315. For example, the prediction master 320 may select a learning-based trajectory-prediction method for a given object in response to determining that the given object is a pedestrian because pedestrians are more likely to display unpredictable behaviors that cannot be accurately modeled by statistical and/or heuristics-based approaches. As another example, a train may follow a regular and predictable set of actions, lending such an object to prediction via a statistical and/or heuristic approach. In some embodiments, the prediction master 320 may select the learning-based trajectory-prediction method and/or a statistics-based trajectory-prediction method to predict the trajectories of the relevant objects.

In some embodiments, the prediction master 320 may direct a given prediction adaptor (such as the learning-based prediction adaptor 330, the statistic-based prediction adaptor 340, and/or the multi-agent based prediction adaptor 350) to instantiate a given trajectory prediction worker 360 according to the trajectory prediction approach identified and/or various computational and/or trajectory parameters. For example, the prediction master 320 may direct the learning based prediction adaptor 330 to instantiate a trajectory prediction worker 360 using the RNN-based predictor 334 for a given object. In some embodiments, the trajectory prediction worker 360 may include a prediction worker core 362 that may be configured based on instructions provided by the prediction master 320. For example, the prediction worker core 362 may perform the operations and processing tasks for the trajectory prediction worker 360 to actually generate the prediction.

In some embodiments, the prediction master 320 may direct multiple trajectory prediction workers 360 be instantiated for any given relevant object, such as the trajectory prediction workers 360a-c. For example, the prediction master 320 may facilitate the determination of a primary prediction and/or one or more secondary predictions. In selecting a trajectory prediction worker 360 to be instantiated, the prediction master 320 may select a reasonably consistent, reliable, and/or fast approach as the primary prediction such that each object will have at least one predicted trajectory as the primary prediction. One or more of the secondary predicted trajectories may represent a prediction that is generated in a more robust, more detailed, and/or more accurate manner than the primary prediction while taking longer and/or using more computational resources to generate the primary prediction. In some embodiments, the primary prediction may include a strict line prediction assumption model in which the object may be expected to move at the same velocity and in the same single direction the object was previously traveling.

In some embodiments, the primary prediction may be determined according to a prevalent probabilistic behavior of a given object, and the secondary predictions may be determined according to one or more other probabilistic behaviors of the given object. In some circumstances, the primary prediction may include a high degree of confidence because the prevalent probabilistic behavior is highly prevalent relative to the other probabilistic behaviors. In these and other circumstances, the trajectory prediction may be the same as or similar to the primary prediction. In some circumstances, the primary prediction may include a low degree of confidence because one or more of the secondary predictions may occur at a significant rate relative to the primary prediction. In these and other circumstances, more than one trajectory prediction may be outputted to account for the primary prediction and the secondary predictions.

In some embodiments, the master watchdog 325 may be configured to adjust and/or update the settings or parameters via which the prediction master 320 may instantiate the trajectory prediction workers 360. For example, the master watchdog 325 may identify an excessive use of CPU processes, memory, or other computing resources and may reduce the number of secondary predictions being generated.

In some embodiments, the adaptive prediction system 300 may include a master watchdog 325 that is configured to regulate, budget, or otherwise control the computations performed by the prediction master 320 and/or the instantiated trajectory prediction workers 360. In some embodiments, the master watchdog 325 may adjust a computational speed, a number of computation cycles, a duration of time within which computations are to be completed, and/or other computational parameters (e.g., a trajectory-prediction window, a granularity of the predictions, and/or a frequency of prediction updates) of the prediction master 320 according to the computational burden caused by the prediction master 320 or imposed on the prediction master 320. In these and other embodiments, the computational burden on the prediction master 320 may be assessed according to an availability of computational resources, an average time taken to perform computational tasks, and/or any other computational performance metrics monitored by the master watchdog 325.

In some circumstances, the master watchdog 325 may determine that the computational burden on the prediction master 320 and/or any associated trajectory prediction workers 360 are high and adjust the operations of the prediction master 320 accordingly. For example, the master watchdog 325 may reduce a time period of trajectory prediction from five seconds to three seconds. As another example, the master watchdog 325 may reduce a number of predicted trajectory points during the time period of trajectory prediction from ten predicted points to four predicted points. As another example, the master watchdog 325 may reduce a frequency of prediction updating from 10 Hz to 5 Hz.

In other circumstances, the master watchdog 325 may determine that the prediction master 320 and/or any associated trajectory prediction workers 360 are not computationally burdened and are capable of performing more and/or faster operations. In these and other circumstances, the master watchdog 325 may increase the time period of trajectory prediction, increase the number of predicted trajectory points, and/or increase the frequency of prediction updating.

In some embodiments, the master watchdog 325 may monitor for a baseline amount of rationality for the predicted trajectories. For example, the master watchdog 325 may monitor for artifacts such as instantaneous direction changes, teletransportation (instantaneously moving from one position to another position), travel at the speed of light, and/or other artifacts, and may flag or ignore the predictions that violate the baseline rules.

In some embodiments, the learning-based trajectory prediction adaptor 330 may include any of a number of learning-based trajectory prediction approaches. For example, the learning-based trajectory prediction adaptor 330 may be facilitated by a multi-layer perceptron predictor ("MLP predictor") 332, a recurrent neural network predictor ("RNN predictor") 334, and/or any other machine-learning (ML) based predictors 336. In some embodiments, the prediction master 320 may determine which learning-based trajectory prediction approach is used to predict the trajectories of the relevant objects. For example, the prediction master 320 may select the RNN predictor 334 for predicting the trajectory of a pedestrian demonstrating a meandering movement pattern and the MLP predictor 332 for predicting the trajectories of pedestrians included in a crowd crossing a crosswalk. Additionally or alternatively, the learning-based predictor to be used to predict the trajectories of the relevant objects may be selected based on one or more computing specifications of the computing system on which the trajectory prediction worker 360 is implemented or instantiated. Additionally or alternatively, the learning-based predictor may be selected according to the contextual information associated with the AV (such as that generated by the prediction context manager 220 of FIG. 2).

In some embodiments, the statistics-based trajectory-prediction adaptor 340 may be facilitated by a rule-based predictor 342, a probability-based predictor 344, and/or any other statistics-based predictors 346. The rule-based predictor 342 may predict the trajectory of a given object that follows one or more rules guiding the movement of the given object. For example, a tractor in a farm field may be guided by a rule indicating that the tractor should not leave the farm field and enter a connected public road. As another example, vehicles in a warehouse may be guided by specific movement routes within the warehouse according to a set of known rules. As an additional example, trains may be presumed to remain on the train tracks and only travel on the train tracks as a rule. Additionally or alternatively, the rule-based predictor 342 may predict a trajectory of a given object based on semantic information relating to the environment of the AV that provides rules for object movement (e.g., traffic signals, traffic signs, lane markings, etc.). For example, a given roadway may include one lane of traffic in each direction and a curvature such that vehicles traveling towards each other in opposite directions may appear to be on a collision course. However, the semantic information about the given roadway including a central lane marking indicating different directions of traffic flow and/or signage indicating road curvature may allow the rule-based predictor to determine that the two oncoming vehicles will not collide.

The probability-based predictor 344 may predict the trajectory of a given object based on a likelihood that the given object will move in a given trajectory according to previous movements of the given object and/or similar objects. In some embodiments, the probability-based predictor 344 may be especially effective at predicting the trajectory of a given object with a limited number of movement choices available to the given object (e.g., at a traffic signal, on a highway ramp, in a roundabout, etc.). For example, a given delivery truck may typically make right turns during a delivery route. As another example, a given forklift in a warehouse may be only able to make left turns. In these and other examples, the probability-based predictor 344 may predict the trajectory of the given delivery truck and the given forklift based on the historic movement behavior of each of the vehicles.

In some embodiments, a multi-agent-based prediction adaptor 350 may provide information about movement of one or more objects included in a multi-agent group. In some embodiments, the multi-agent-based prediction adaptor 350 may include a large-scale simulation-based predictor 352, a vehicle-to-everything ("V2X") predictor 354, and/or any other multi-agent predictors 356. The multi-agent predictors may each be communicatively coupled to a given object included in the environment of the AV, and the multi-agent predictors may communicate trajectory information to the AV such that trajectory information for each of the given objects is known. For example, a V2X predictor 354 coupled to a light pole around a corner of a public roadway relative to the AV may provide trajectory information about an oncoming vehicle that has not yet been detected by the AV.

In some embodiments, the large-scale simulation-based predictor 352 may operate in a similar manner to communications associated with the V2X predictor 354. For example, communication from the V2X predictor 354 may be known to be completely accurate because it is communicated from the other object to inform the AV of the trajectory that the other object will be traveling. In a comparable manner, the large-scale simulation-based predictor 352 may provide a known trajectory (the simulation) that may be checked against the route the AV actually takes such that the performance of the large-scale simulation can be checked or verified. In some embodiments, a fleet may be managed, such as a host of AVs operating in a warehouse. Continuing the example, each AV of the warehouse may generate its own respective decisions for travel and may communicate the trajectory for the AV to a backend system and then on to the other AVs of the fleet such that they can have a known expected trajectory for each of the AVs, rather than a prediction for the other vehicles in the fleet.

In some embodiments, the predicted trajectories as determined by each of the prediction approaches (learning-based, statistics-based, and/or multi-agent-based) may be output as multiple streams of predicted trajectories 365 in which each of the predicted trajectories corresponds to a respective relevant object as determined by a relevancy prediction worker (such as the relevancy prediction worker 230 of FIG. 2). In some embodiments, the streams of predicted trajectories 365 may include the predicted trajectories (whether primary or secondary) for each of the plurality of relevant objects 305. Additionally or alternatively, multiple potential trajectories, which may include the likelihood of any of the multiple potential trajectories, may be output in the multiple streams 365.

In some embodiments, a prediction trajectory combiner 370 may combine the multiple streams of trajectory predictions 365 as one or more trajectory streams including the primary and/or secondary predictions 380. In these and other embodiments, the prediction trajectory combiner 370 may be configured to sort out the primary and/or secondary trajectory predictions for a given object for a given point in time from all of the trajectory predictions being generated by the trajectory prediction workers 360, which may be output as the primary and/or secondary predictions 380. In some embodiments, the primary and/or secondary predictions 380 may be combined with information regarding the relevant objects 305, and may be provided to a down stream decision-making engine which may decide where the AV is to go. For example, the decision-making engine may utilize the primary and/or secondary predicted trajectories 380 and the relevant objects 305 to make a decision of where to route the AV. In some embodiments, all of the primary and secondary predictions for a given relevant object at the given point in time may be combined in a single package for the downstream systems, and/or the primary predictions and whichever of the secondary predictions are completed in time for the relevant point in time.

Modifications, additions, or omissions may be made to the system 300 without departing from the scope of the present disclosure. For example, the designations of different elements in the manner described is meant to help explain concepts described herein and is not limiting. For instance, in some embodiments, the prediction master 320, and/or the trajectory prediction workers 360 are delineated in the specific manner described to help with explaining concepts described herein but such delineation is not meant to be limiting. Further, the system 300 may include any number of other elements or may be implemented within other systems or contexts than those described.

In some embodiments, various aspects of the system 200 and/or the system 300 may be implemented to accomplish the operations described herein. For example, the input manager 210, the prediction context manager 220, the relevancy prediction workers 230, the fine level prediction adaptor 310, the prediction master 320, the master watchdog 325, the learning based prediction adaptors 330, the statistics based prediction adaptor 340, the multi-agent based prediction adaptor 350, the trajectory prediction worker 360, and/or the prediction trajectory combiner 370 may include code and/or routines configured to enable a computing system to perform one or more operations. In these and other embodiments, the input manager 210, the prediction context manager 220, the relevancy prediction workers 230, the fine level prediction adaptor 310, the prediction master 320, the master watchdog 325, the learning based prediction adaptors 330, the statistics based prediction adaptor 340, the multi-agent based prediction adaptor 350, the trajectory prediction worker 360, and/or the prediction trajectory combiner 370 may be implemented using hardware including a processor, a microprocessor (e.g., to perform or control performance of one or more operations), a field-programmable gate array (FPGA), or an application-specific integrated circuit (ASIC). In some other instances, the input manager 210, the prediction context manager 220, the relevancy prediction workers 230, the fine level prediction adaptor 310, the prediction master 320, the master watchdog 325, the learning based prediction adaptors 330, the statistics based prediction adaptor 340, the multi-agent based prediction adaptor 350, the trajectory prediction worker 360, and/or the prediction trajectory combiner 370 may be implemented using a combination of hardware and software. In the present disclosure, operations described as being performed by the input manager 210, the prediction context manager 220, the relevancy prediction workers 230, the fine level prediction adaptor 310, the prediction master 320, the master watchdog 325, the learning based prediction adaptors 330, the statistics based prediction adaptor 340, the multi-agent based prediction adaptor 350, the trajectory prediction worker 360, and/or the prediction trajectory combiner 370 may include operations that the respective components may direct a corresponding system to perform.

Figure 4:
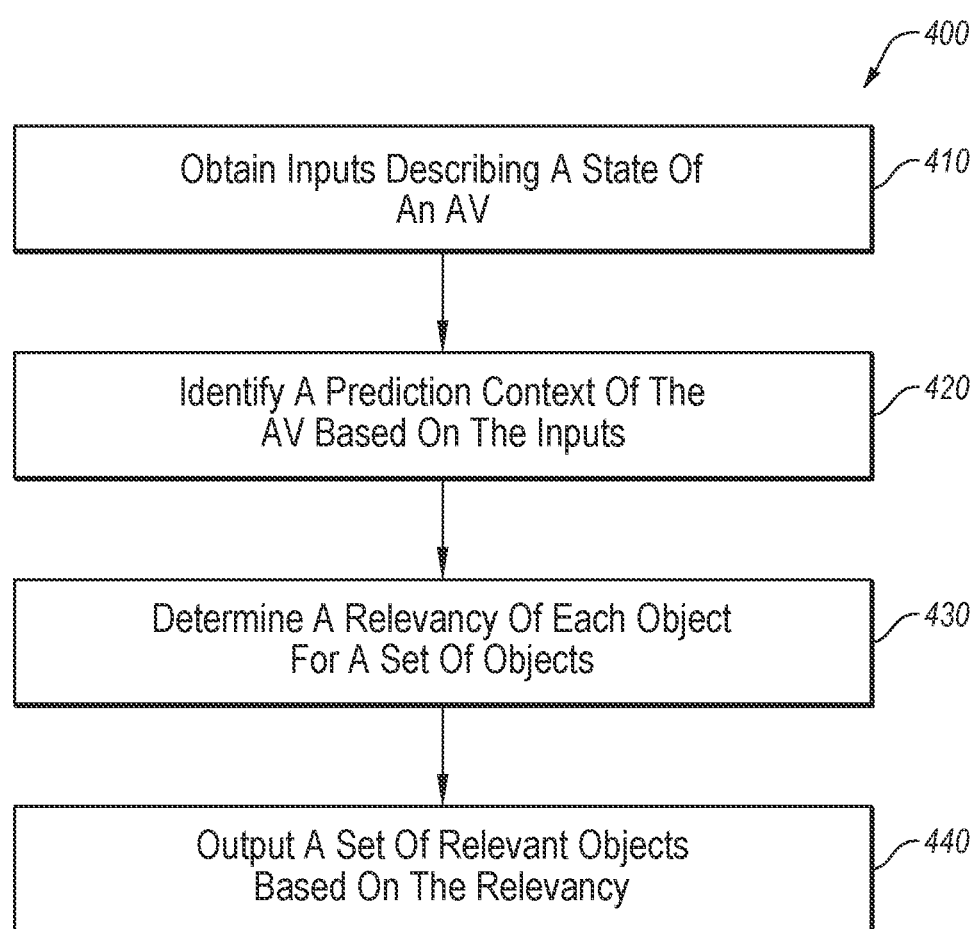
FIG. 4 illustrates a flowchart of an example method of obtaining a set of relevant objects according to one or more embodiments of the present disclosure.

FIG. 4 is a flowchart of an example method 400 of obtaining a set of relevant objects according to at least one embodiment of the present disclosure. The method 400 may be performed by any suitable system, apparatus, or device. For example, the system 200 of FIG. 2 and/or the system of FIG. 3 and/or any of the subcomponents thereof may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

At block 410, inputs describing a state of an AV may be obtained. For example, one or more inputs such as routing information, localization information, world engine updates, and/or HD maps may be obtained. Such information may be obtained by one or more sensors and/or one or more other upstream systems.

At block 420, a prediction context of the AV may be identified based on the inputs received at the block 410. For example, the context of the AV may be predicted by a prediction context manager. Examples of such a context may include operating in a warehouse, on a highway, the vehicle being parked, among others.

At block 430, a relevancy of each object for a set of objects may be determined based on the context and/or properties of the objects. For example, for a given object the relevancy of the object may be determined by a relevancy prediction worker. In these and other embodiments, a prediction tree constructor and/or a relevancy core may operate to predict the relevancy of each object in the set of objects.

At block 440, a set of relevant objects may be output based on the relevancy of the objects. For example, as the various objects are identified as relevant or irrelevant, the relevant objects may be combined into a set and may be output to other downstream systems, such as the system 300 of FIG. 3.

Figure 5:
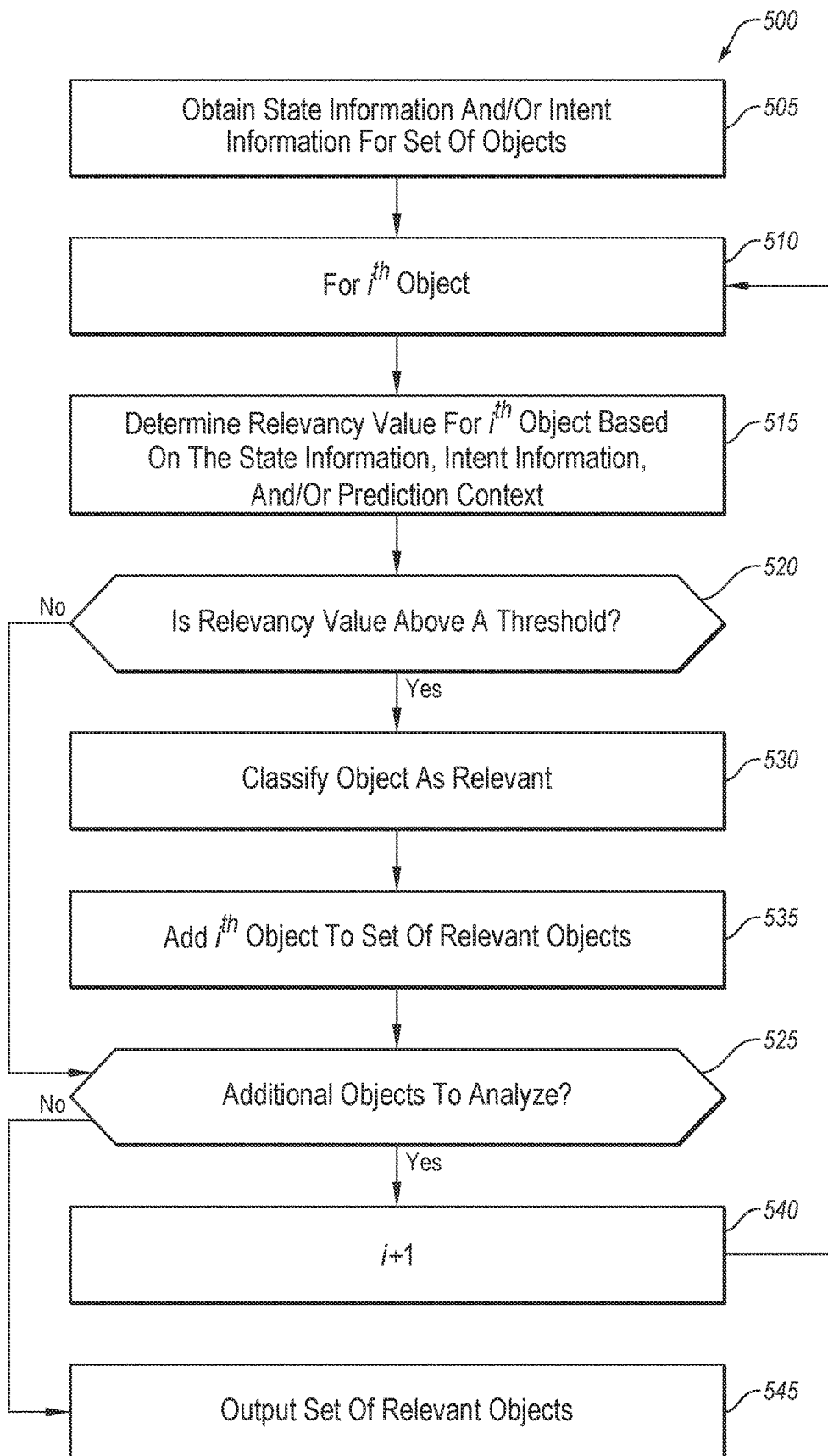
FIG. 5 illustrates a flowchart of another example method of obtaining a set of relevant objects according to one or more embodiments of the present disclosure.

FIG. 5 illustrates a flowchart of an example method 500 of obtaining a set of relevant objects according to at least one embodiment of the present disclosure. The method 500 may be performed by any suitable system, apparatus, or device. For example, the system 200 of FIG. 2 and/or the system 300 of FIG. 3 and/or any of the subcomponents thereof may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

At block 505, state information and/or intent information may be obtained for a set of objects. The intent information may include information describing the purpose for the motion of the object and/or other information aside from pure physical parameters may be determined. For example, information describing the state of the AV may be obtained based on data from sensors and/or processed information based on the sensor data. As another example, intent information may be derived based on a classification of the object. In some embodiments, the block 505 may be similar or comparable to the block 410.

At block 510, the set of objects may be initialized such that the $i^{th}$ object of the set of objects may be identified for analysis.

At block 515, a relevancy value may be determined for the $i^{th}$ object based on the state information, the intent information, and/or prediction context information. For example, the state information, the intent information, and/or the prediction context information may be provided to a relevancy prediction worker to predict the relevancy value of the $i^{th}$ object. For example, a machine learning process, a heuristic approach, or other analysis technique may be used to generate a value representative of the relative relevancy of the $i^{th}$ object to the operation of an AV.

At block 520, a determination may be made whether the relevancy value of the $i^{th}$ object is above a threshold. If the relevancy value is not above the threshold, the method 500 may proceed to the block 525. If the relevancy value is at or above the threshold, the method 500 may proceed to the block 530.

At block 525, a determination may be made whether there are additional objects in the set of objects to have their relevancy determined. If there are additional objects, the method 500 may proceed to the block 540. If there are no additional objects, the method 500 may proceed to the block 545.

At block 530, the $i^{th}$ object may be classified as relevant based on the relevancy value being above the threshold.

At block 535, the $i^{th}$ object may be added to a set of relevant objects. For example, a set of relevant objects may be initialized as a null set and as each object is identified as relevant while analyzing the various objects of the set of objects, the objects identified as relevant may be added to the set of relevant objects. After the block 535, the method 500 may proceed to the block 525 to analyze any remaining objects in the set of objects for which relevancy has not yet been determined.

At block 540, the value of i may be incremented such that the next object in the set of objects may be analyzed. After the block 540, the method 500 may proceed to the block 510 such that the next object in the set of objects may be analyzed to determine the relevancy of the next object.

At block 545, the set of relevant objects constructed by adding the relevant objects may be output. For example, the set of relevant objects may be passed downstream to other systems, such as a decision-making system, a trajectory-prediction system, and/or any other relevant systems related to operation of an AV.

Figure 6:
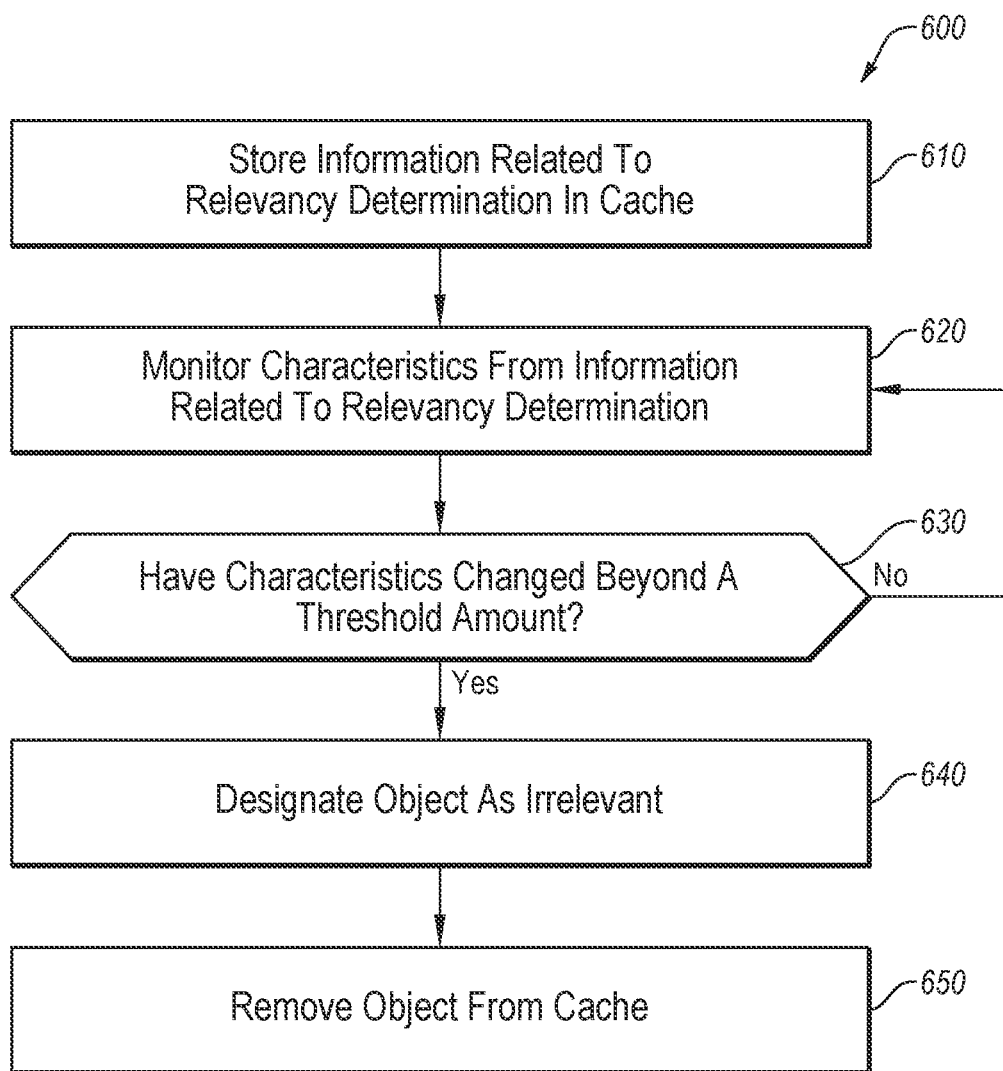
FIG. 6 illustrates a flowchart of an example method of managing a cache associated with obtaining a set of relevant objects according to one or more embodiments of the present disclosure.

FIG. 6 illustrates a flowchart of an example method 600 of managing a cache associated with obtaining a set of relevant objects according to at least one embodiment of the present disclosure. The method 600 may be performed by any suitable system, apparatus, or device. For example, the system 200 of FIG. 2 and/or the system 300 of FIG. 3 and/or any of the subcomponents thereof may perform one or more operations associated with the method 600. Although illustrated with discrete blocks, the steps and operations associated with one or more of the blocks of the method 600 may be divided into additional blocks, combined into fewer blocks, or eliminated, depending on the particular implementation.

At block 610, information related to a relevancy determination may be stored in a cache. For example, the decisions made at each branch in a prediction tree construct and/or the information used to make the decision at the branches may be stored in the cache. As another example, the inputs to a machine-learning or heuristics-based approach to determining relevancy may be stored in conjunction with the relevancy decision in the cache.

At block 620, one or more characteristics from the information related to the relevancy determination may be monitored. For example, the characteristics that formed the basis for the various decisions in the prediction tree construct that lead to a finding of relevance may be monitored. As another example, the characteristics that were used as the inputs to the machine-learning approach to a relevancy determination may be monitored.

At block 630, a determination may be made whether the characteristics have changed beyond a threshold amount. For example, the values of the characteristics and/or the threshold(s) that lead to the various decisions may be monitored as the AV moves and/or progresses. In some embodiments, the determination may be made based on multiple characteristics and/or an entire tree structure. If the characteristics are changed beyond the threshold(s), the method 600 may proceed to the block 640. If the characteristics have not changed beyond the threshold(s), the method 600 may return to the block 620 to continue to monitor the characteristics of the relevancy determinations.

At block 640, the object may be designated as irrelevant. For example, based on the changes to the characteristics, the object may be reclassified as irrelevant instead of being relevant.

At block 650, the object may be removed from the cache. For example, after being classified as irrelevant, the object may be removed from the cache such that additional storage space is available in the cache. For example, the cache may store the relevant objects and/or information related to the relevant objects. When no longer relevant, the objects and/or their associated information may be removed from the cache. The use of the cache may facilitate rapid identification and monitoring of objects relevant to the operation of the AV.

Figure 7:
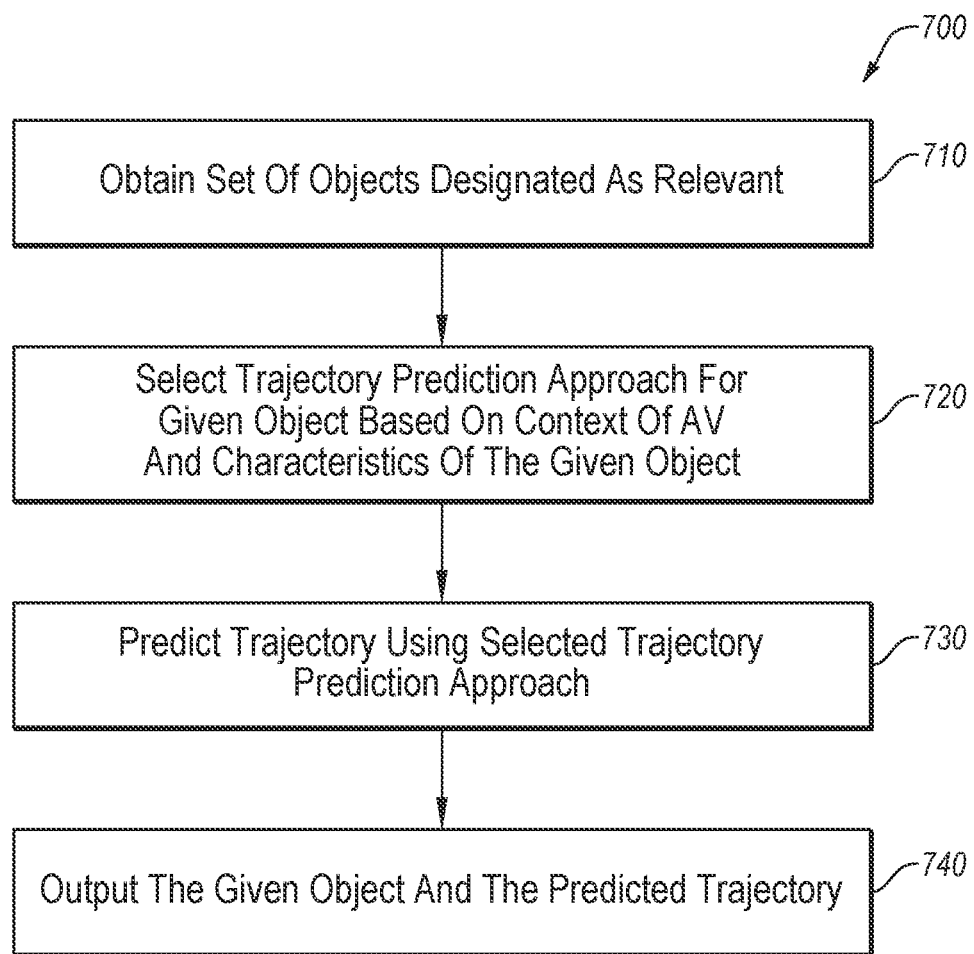
FIG. 7 illustrates a flowchart of an example method of predicting trajectories for relevant objects according to one or more embodiments of the present disclosure.

FIG. 7 illustrates a flowchart of an example method 700 of predicting trajectories for relevant objects according to at least one embodiment of the present disclosure. The method 700 may be performed by any suitable system, apparatus, or device. For example, the system 200 of FIG. 2 and/or the system 300 of FIG. 3 and/or any of the subcomponents thereof may perform one or more operations associated with the method 700. Although illustrated with discrete blocks, the steps and operations associated with one or more of the blocks of the method 700 may be divided into additional blocks, combined into fewer blocks, or eliminated, depending on the particular implementation.

At block 710, a set of objects designated as relevant may be obtained. For example, the set of objects may be obtained following the methods 400 and/or 500. Additionally or alternatively, a cloud-based system or other remote system may communicate the relevant set of objects to an AV.

At block 720, one or more trajectory prediction approaches may be selected for a given object based on context of the AV and/or characteristics of the given object. For example, a prediction master may identify which approach is to be used when predicting one or more trajectories for the given object.

At block 730, a trajectory may be predicted using the selected trajectory prediction approach. For example, the prediction master may instantiate a trajectory prediction worker that is configured to use the projection approach selected at the block 720. In some embodiments, if more than one approach is selected so that multiple trajectories are predicted, multiple trajectory prediction workers may be instantiated, with each operating according to one particular approach and according to a particular set of parameters. In these and other embodiments, the predicted trajectory may include a certain number of data points across a certain period of time (such as five data points over three seconds).

At block 740, the given object and the predicted trajectory may be output. For example, a data package that includes the given object and one or more of the predicted trajectories may be combined into a single data package that may be provided to downstream systems, such as a decision-making system that may decide the manner in which the AV is to be operated. In some embodiments, the block 740 may include combining all relevant objects with their respective predicted trajectory or trajectories.

Figure 8:
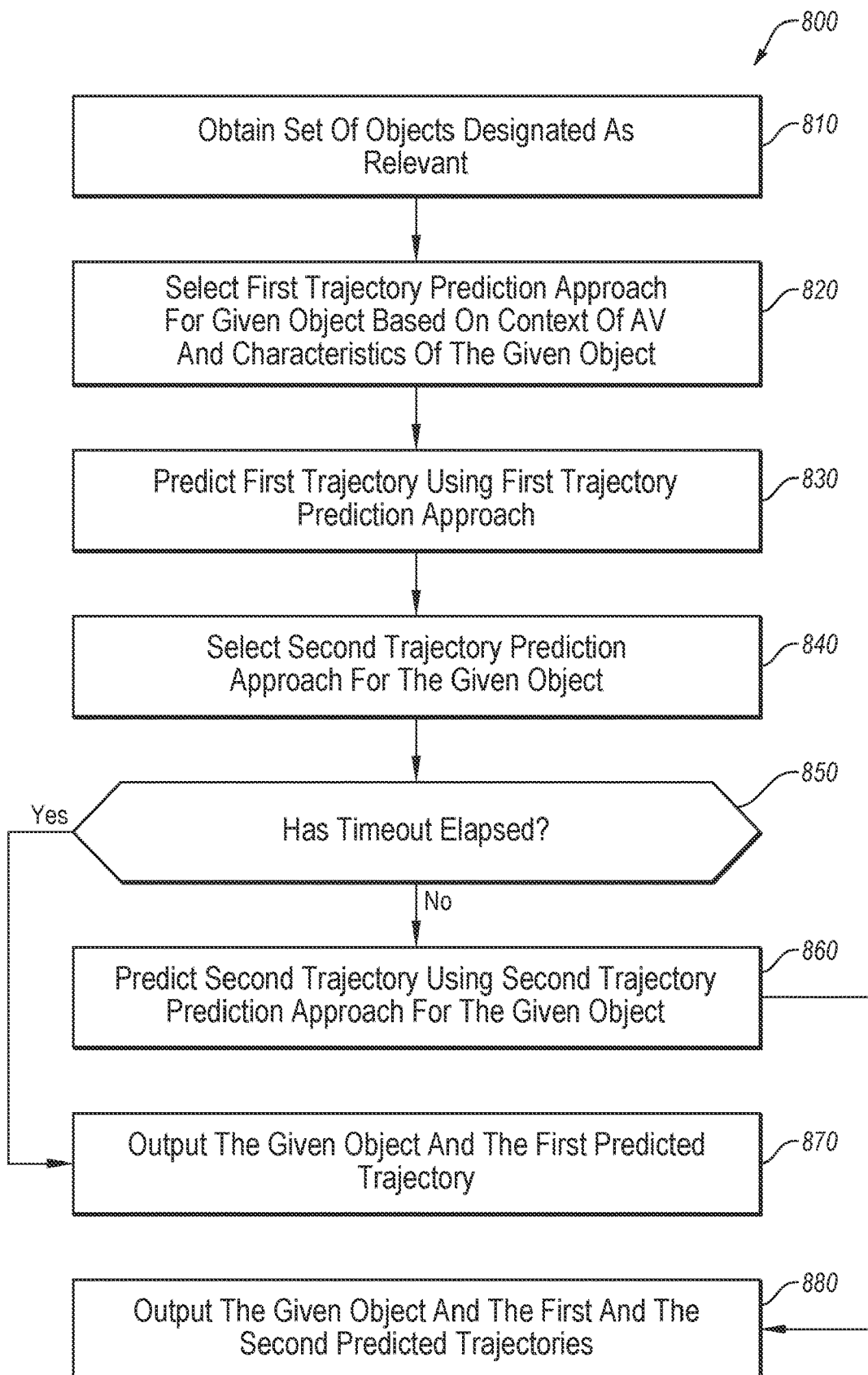
FIG. 8 illustrates a flowchart of an example method of predicting trajectories according to one or more embodiments of the present disclosure.

FIG. 8 illustrates a flowchart of an example method of predicting trajectories for relevant objects according to at least one embodiment of the present disclosure. The method 800 may be performed by any suitable system, apparatus, or device. For example, the system 200 of FIG. 2 and/or the system 300 of FIG. 3 and/or any of the subcomponents thereof may perform one or more operations associated with the method 800. Although illustrated with discrete blocks, the steps and operations associated with one or more of the blocks of the method 800 may be divided into additional blocks, combined into fewer blocks, or eliminated, depending on the particular implementation.

At block 810, a set of objects designated as relevant may be obtained. The block 810 may be similar or comparable to the block 710.

At block 820, a first trajectory prediction approach may be selected for a given object, where the first trajectory prediction approach may be selected based on a context of the AV and characteristics of the given object. For example, a statistic-based prediction approach may be utilized when the characteristics and/or the context of the object suggest that the object is likely to follow one or more rules, such as a train on a train track. As another example, a learning-based prediction approach may be utilized when the characteristics and/or the context of the object suggest that the object is variable in how it will move, such as a pedestrian crossing the street. In some embodiments, the block 820 may be similar or comparable to the block 720.

At block 830, a first trajectory may be predicted for the given object using the selected first trajectory prediction approach. For example, the prediction master may instantiate a trajectory prediction worker according to the approach selected at the block 820. In some embodiments, the block 830 may be similar or comparable to the block 730.

At block 840, a second trajectory prediction approach for the given object may be selected. In some embodiments, the first trajectory prediction approach of the block 820 may be a reliable and consistent trajectory prediction approach, such as a strict line prediction assumption model that may be used as a primary prediction. In these and other embodiments, the second trajectory prediction approach may include a more robust and/or more accurate prediction approach, while also using additional computing resources and/or taking more time than the first trajectory prediction approach.

At block 850, a determination may be made whether a timeout has elapsed. For example, the AV systems may expect an updated set of predicted trajectories at a set frequency, such as 5 Hz. In these and other embodiments, the timeout may be tied to the frequency such that at the conclusion of each period of time of the inverse of the frequency (e.g., for a 5 Hz example every 20 ms), an updated set of relevant objects with associated trajectories may be output. If the timeout has not elapsed, the method 800 may proceed to the block 860. If the timeout has elapsed, the method 800 may proceed to the block 870.

At block 860, a second trajectory may be predicted for the given object using the selected second trajectory prediction approach of the block 840. For example, the prediction master may instantiate a trajectory prediction worker according to the approach selected at the block 840. In these and other embodiments, the block 860 may represent a completion of the tasks or processes utilized to generate the second predicted trajectory. After the block 860, the method 800 may proceed to the block 880.

At block 870, the given object and the first predicted trajectory may be output. For example, in circumstances in which the second predicted trajectory has not been completed when the timeout has elapsed, only the given object and the first predicted trajectory (e.g., the primary predicted trajectory) may be outputted.

At block 880, the given object and both the first and the second predicted trajectories may be output. For example, in circumstances in which the second predicted trajectory has been completed when the timeout has elapsed, the second predicted trajectory may be outputted in addition to the first predicted trajectory for the object. the given object and the first predicted trajectory (e.g., the primary predicted trajectory) may be outputted.

Figure 9:
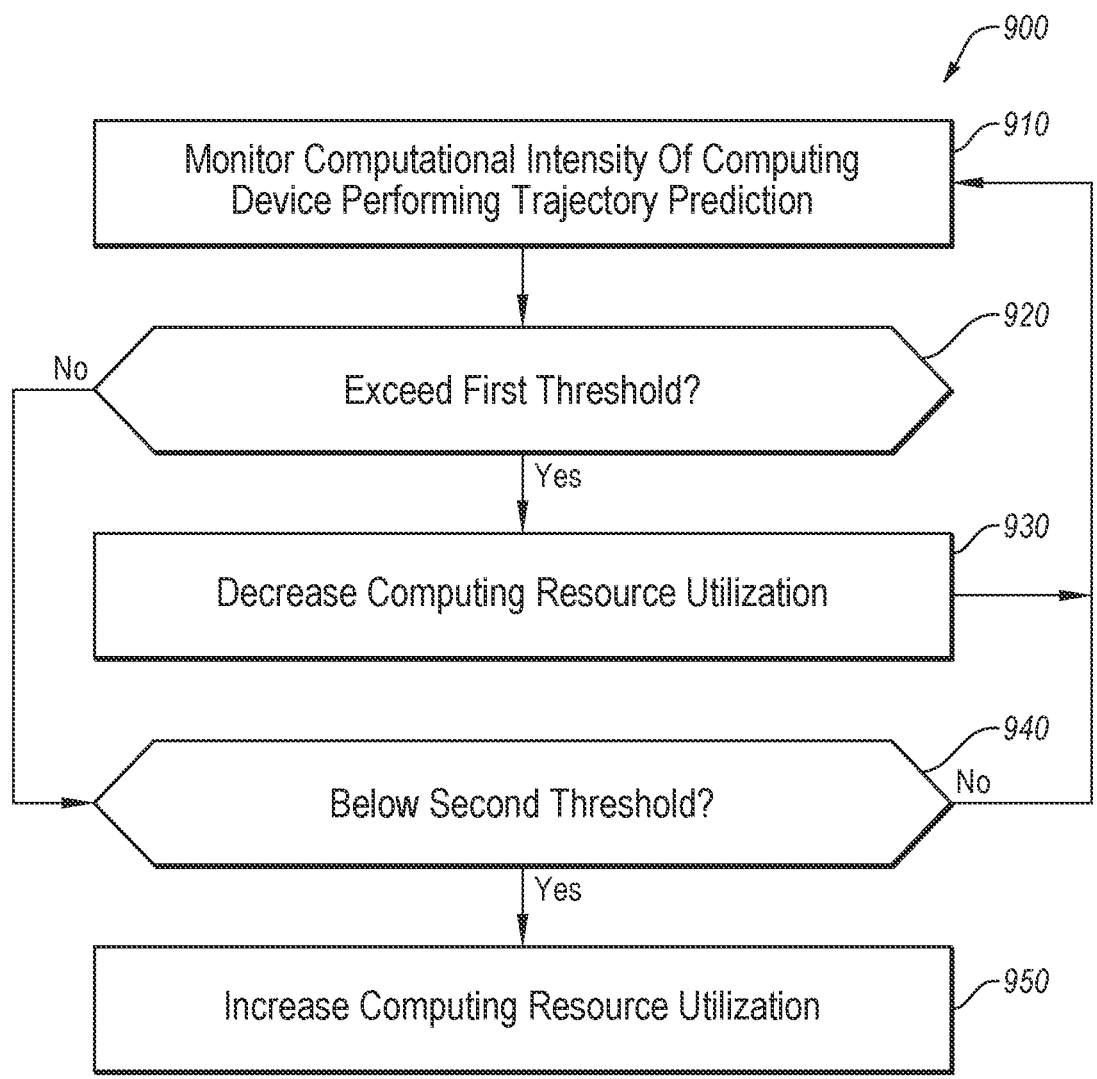
FIG. 9 illustrates a flowchart of an example method of monitoring computing resource usage according to one or more embodiments of the present disclosure.

FIG. 9 illustrates a flowchart of an example method of monitoring computing resource usage according to at least one embodiment of the present disclosure. The method 900 may be performed by any suitable system, apparatus, or device. For example, the system 200 of FIG. 2 and/or the system 300 of FIG. 3 and/or any of the subcomponents thereof may perform one or more operations associated with the method 900. Although illustrated with discrete blocks, the steps and operations associated with one or more of the blocks of the method 900 may be divided into additional blocks, combined into fewer blocks, or eliminated, depending on the particular implementation.

At block 910, the computational intensity of a computing device performing trajectory predictions may be monitored. For example, a master watchdog or other component or device may be configured to monitor the computational intensity of the computing device that performs the trajectory predictions. The computational intensity may be based off of a single characteristic of the computing device or multiple characteristics, including the number of processing cycles, an amount of memory being used, an amount of free storage, an amount of GPU cycles being used, a temperature of the computing device, a temperature of the GPU, an amount of storage in a cache, among other monitorable characteristics of the computing device. In some embodiments, the computational intensity may include a value representative of the overall load placed on the computing device.

At block 920, a determination may be made whether the computational intensity has exceeded a first threshold. For example, the computational intensity may be compared to the first threshold where the first threshold represents an excessive or high computational load on the computing device. In these and other embodiments, the first threshold may represent a point where the computing device may be damaged, or a point where performance of the computing device is significantly degraded, or any other metric. In some embodiments, the computational intensity may be monitored for one or more of the trajectory prediction workers specifically, rather than the entire computing device. For example, the monitoring of the block 910 and the determination of the block 920 may be for the computational intensity for one or more of the trajectory prediction workers. If the computational intensity has exceeded the first threshold, the method 900 may proceed to the block 930. If the computational intensity has not exceeded the threshold, the method 900 may proceed to the block 940.

At block 930, the computing resource utilization may be decreased. For example, a duration of time for which a prediction is generated may be decreased (e.g., from five seconds to three seconds), a number of points in the predicted trajectory may be decreased (e.g., from five points to three points), a number of secondary predictions may be decreased (e.g., from three secondary predictions to one or even zero secondary prediction), a style of primary and/or secondary predictions may be adjusted (e.g., from a more computationally expensive prediction approach to a less computationally expensive prediction approach), among other changes. In some embodiments, this change may vary dynamically and based on detected parameters of the computing system. After the block 930, the method 900 may return to the block 910 to continue to monitor the computational intensity of the computing device.

At block 940, a determination may be made whether the computational intensity is below a second threshold. For example, the computational intensity may be compared to the second threshold where the second threshold represents a low computational load on the computing device. In these and other embodiments, the second threshold may represent a point where the computing resources are being wasted or are underutilized, or any other metric. In some embodiments, the computational intensity may be monitored for one or more of the trajectory prediction workers specifically, rather than the entire computing device. For example, the monitoring of the block 910 and the determination of the block 940 may be for the computational intensity for one or more of the trajectory prediction workers. If the computational intensity his below the second threshold, the method 900 may proceed to the block 950. If the computational intensity is not below the second threshold, the method 900 may return to the block 910.

At block 950, the computing resource utilization may be increased. For example, based on the availability of additional computing resources, more computing resources may be utilized in predicting the trajectories. For example, a duration of time for which a prediction is generated may be increased (e.g., from two seconds to four seconds), a number of points in the predicted trajectory may be increased (e.g., from two points to four points), a number of secondary predictions may be increased (e.g., from one secondary prediction to three zero secondary prediction), a style of primary and/or secondary predictions may be adjusted (e.g., from a less computationally expensive prediction approach to a more computationally expensive prediction approach), among other changes. After the block 950, the method 900 may return to the block 910 to continue to monitor the computational intensity of the computing device.

Modifications, additions, or omissions may be made to the methods 400, 500, 600, 700, 800, and/or 900 of FIGS. 4, 5, 6, 7, 8, and/or 9, respectively, without departing from the scope of the disclosure. For example, the designations of different elements in the manner described is meant to help explain concepts described herein and is not limiting. Further, the methods 400, 500, 600, 700, 800, and/or 900 may include any number of other elements or may be implemented within other systems or contexts than those described. Additionally or alternatively, the operations of the methods 400, 500, 600, 700, 800, and/or 900 may be performed in different order, certain operations may be removed, expanded into additional operations, and/or performed simultaneously.

Figure 10:
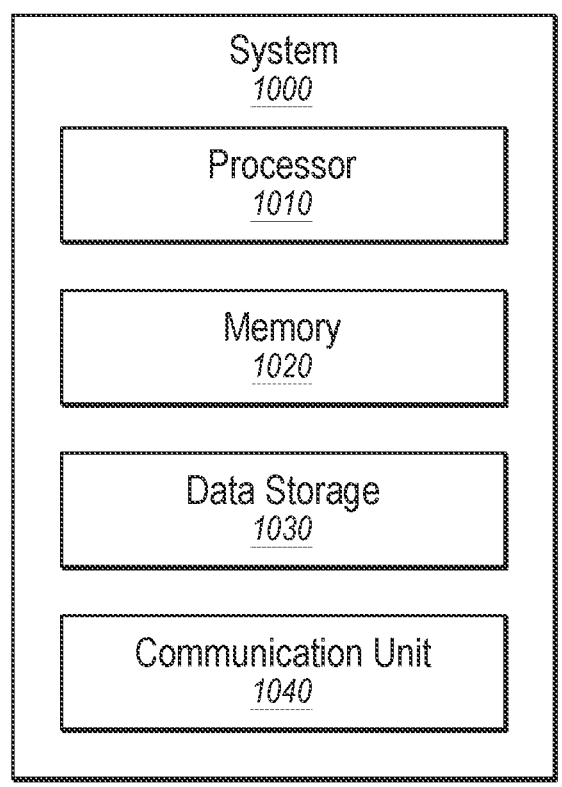
FIG. 10 is an example computing system.

FIG. 10 illustrates an example computing system 1000, according to at least one embodiment described in the present disclosure. The computing system 1000 may include a processor 1010, a memory 1020, a data storage 1030, and/or a communication unit 1040, which all may be communicatively coupled. Any or all of the adaptive prediction system 200 of FIG. 2 and/or the system 300 of FIG. 3 may be implemented as a computing system consistent with the computing system 1000, including the prediction context manager 220, the relevancy prediction workers 230, the prediction master 320, and/or the trajectory prediction workers 360.

Generally, the processor 1010 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 10, it is understood that the processor 1010 may include any number of processors distributed across any number of network or physical locations that are configured to perform individually or collectively any number of operations described in the present disclosure. In some embodiments, the processor 1010 may interpret and/or execute program instructions and/or process data stored in the memory 1020, the data storage 1030, or the memory 1020 and the data storage 1030. In some embodiments, the processor 1010 may fetch program instructions from the data storage 1030 and load the program instructions into the memory 1020.

After the program instructions are loaded into the memory 1020, the processor 1010 may execute the program instructions, such as instructions to perform operations associated with prediction context manager 220, the relevancy prediction workers 230, the prediction master 320, and/or the trajectory prediction workers 360.

The memory 1020 and the data storage 1030 may include computer-readable storage media or one or more computer-readable storage mediums for having computer-executable instructions or data structures stored thereon. Such computer-readable storage media may be any available media that may be accessed by a general-purpose or special-purpose computer, such as the processor 1010. For example, the memory 1020 and/or the data storage 1030 may store the contextual object list, the relevant objects, the prediction type context, and/or the predicted trajectories. In some embodiments, the computing system 1000 may or may not include either of the memory 1020 and the data storage 1030.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1010 to perform a certain operation or group of operations.

The communication unit 1040 may include any component, device, system, or combination thereof that is configured to transmit or receive information over a network. In some embodiments, the communication unit 1040 may communicate with other devices at other locations, the same location, or even other components within the same system. For example, the communication unit 1040 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1040 may permit data to be exchanged with a network and/or any other devices or systems described in the present disclosure. For example, the communication unit 1040 may allow the system 1000 to communicate with other systems, such as computing devices and/or other networks.

One skilled in the art, after reviewing this disclosure, may recognize that modifications, additions, or omissions may be made to the system 1000 without departing from the scope of the present disclosure. For example, the system 1000 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   obtaining a set of objects designated as relevant to operation of an autonomous vehicle;
   predicting a first trajectory of the given object using a rule-based trajectory prediction approach that involves one or more rules specifying allowable movements of the given object based on context of the autonomous vehicle and characteristics of the given object;
   predicting a second trajectory of the given object using a probability-based trajectory prediction approach that involves previous movement choices of the given object based on the context of the autonomous vehicle and the characteristics of the given object;
   outputting the given object paired with the first predicted trajectory and the second predicted trajectory; and
   maneuvering the autonomous vehicle based on the outputted given object, the first predicted trajectory, and the second predicted trajectory.

2. The method of claim 1, further comprising:
   predicting a third trajectory of the given object using a multi-agent-based trajectory prediction approach that involves receiving trajectory information about the given object communicated by the given object,
   wherein the outputted given object is further paired with the third predicted trajectory and maneuvering the autonomous vehicle is further based on the third predicted trajectory.

3. The method of claim 1, further comprising monitoring a computational intensity of a computing device performing the prediction of the first trajectory of the given object.

4. The method of claim 3, further comprising:
   determining whether the computational intensity exceeds a first threshold; and
   responsive to determining that the computational intensity exceeds the first threshold, decreasing at least one of:
   (1) a length of time of the prediction of the first trajectory, (2) a number of points in the predicted first trajectory, or (3) a frequency at which the predicted first trajectory is updated.

5. The method of claim 3, further comprising:
determining whether the computational intensity is below a second threshold; and
responsive to determining that the computational intensity is below the second threshold, increasing at least one of: (1) a length of time of the prediction of the first trajectory, (2) a number of points in the predicted first trajectory, or (3) a frequency at which the predicted first trajectory is updated.

6. One or more non-transitory computer-readable media containing instructions which, when executed by one or more processors, cause a system to perform operations, the operations comprising:
obtaining a set of objects designated as relevant to operation of an autonomous vehicle;
predicting a first trajectory of the given object using a rule-based trajectory prediction approach that involves one or more rules specifying allowable movements of the given object based on context of the autonomous vehicle and characteristics of the given object;
predicting a second trajectory of the given object using a probability-based trajectory prediction approach that involves previous movement choices of the given object based on the context of the autonomous vehicle and the characteristics of the given object;
outputting the given object paired with the first predicted trajectory and the second predicted trajectory; and
maneuvering the autonomous vehicle based on the outputted given object, the first predicted trajectory, and the second predicted trajectory.

7. The non-transitory computer-readable media of claim 6, further comprising:
predicting a third trajectory of the given object using a multi-agent-based trajectory prediction approach that involves receiving trajectory information about the given object communicated by the given object,
wherein the outputted given object is further paired with the third predicted trajectory and maneuvering the autonomous vehicle is further based on the third predicted trajectory.

8. The non-transitory computer-readable media of claim 6, the operations further comprising monitoring a computational intensity of a computing device performing the prediction of the first trajectory of the given object.

9. The non-transitory computer-readable media of claim 8, the operations further comprising:
determining whether the computational intensity exceeds a first threshold; and
responsive to determining that the computational intensity exceeds the first threshold, decreasing at least one of: (1) a length of time of the prediction of the first trajectory, (2) a number of points in the predicted first trajectory, or (3) a frequency at which the predicted first trajectory is updated.

10. The non-transitory computer-readable media of claim 8, the operations further comprising:
determining whether the computational intensity is below a second threshold; and
responsive to determining that the computational intensity is below the second threshold, increasing at least one of: (1) a length of time of the prediction of the first trajectory, (2) a number of points in the predicted first trajectory, or (3) a frequency at which the predicted first trajectory is updated.

11. A system comprising:
one or more processors
one or more non-transitory computer-readable media containing instructions which, when executed by the one or more processors, cause the system to perform operations, the operations comprising:
obtaining a set of objects designated as relevant to operation of an autonomous vehicle;
predicting a first trajectory of the given object using a rule-based trajectory prediction approach that involves one or more rules specifying allowable movements of the given object based on context of the autonomous vehicle and characteristics of the given object;
predicting a second trajectory of the given object using a probability-based trajectory prediction approach that involves previous movement choices of the given object based on the context of the autonomous vehicle and the characteristics of the given object;
outputting the given object paired with the first predicted trajectory and the second predicted trajectory; and
maneuvering the autonomous vehicle based on the outputted given object, the first predicted trajectory, and the second predicted trajectory.

12. The system of claim 11, further comprising:
predicting a third trajectory of the given object using a multi-agent-based trajectory prediction approach that involves receiving trajectory information about the given object communicated by the given object,
wherein the outputted given object is further paired with the third predicted trajectory and maneuvering the autonomous vehicle is further based on the third predicted trajectory.

13. The system of claim 11, the operations further comprising monitoring a computational intensity of a computing device performing the prediction of the first trajectory of the given object.

14. The system of claim 13, the operations further comprising:
determining whether the computational intensity exceeds a first threshold; and
responsive to determining that the computational intensity exceeds the first threshold, decreasing at least one of: (1) a length of time of the prediction of the first trajectory, (2) a number of points in the predicted first trajectory, or (3) a frequency at which the predicted first trajectory is updated.

* * * * *